(12) United States Patent
Siefert et al.

(10) Patent No.: US 10,959,410 B2
(45) Date of Patent: Mar. 30, 2021

(54) DEVICE FOR SEPARATING PARASITES

(71) Applicant: VETO-PHARMA, Villebon sur Yvette (FR)

(72) Inventors: Benoit Siefert, Villebon sur Yvette (FR); Ludovic De Feraudy, Villebon sur Yvette (FR); Gael Charpentier, Villebon sur Yvette (FR); Raphaele Massard, Villebon sur Yvette (FR)

(73) Assignee: VETO-PHARMA, Villebon sur Yvette (FR)

( * ) Notice: Subject to any disclaimer, the term of this patent is extended or adjusted under 35 U.S.C. 154(b) by 114 days.

(21) Appl. No.: 15/419,371

(22) Filed: Jan. 30, 2017

(65) Prior Publication Data

US 2018/0084764 A1    Mar. 29, 2018

(30) Foreign Application Priority Data

Sep. 29, 2016 (CA) .................................. CA 2943917

(51) Int. Cl.
*A01K 47/06* (2006.01)
*A01K 51/00* (2006.01)

(52) U.S. Cl.
CPC .............. *A01K 47/06* (2013.01); *A01K 51/00* (2013.01)

(58) Field of Classification Search
CPC ........ A01K 47/00; A01K 51/00; A01K 47/06; B65D 21/0202; B65D 21/0211; B65D 21/0216; B65D 85/50
USPC ........... 449/1, 2, 52, 56; 220/23.87, 50, 506, 220/528
See application file for complete search history.

(56) References Cited

U.S. PATENT DOCUMENTS

| | | | | |
|---|---|---|---|---|
| 4,096,663 A * | 6/1978 | Silver | ..................... | A01G 27/06 47/80 |
| 4,299,055 A * | 11/1981 | Dziewulski | .............. | A01G 9/04 47/71 |
| 4,867,731 A * | 9/1989 | Willard | ................... | A01K 51/00 449/2 |
| 5,189,947 A * | 3/1993 | Yim | ........................ | A47J 27/04 126/369 |
| 6,616,507 B1 * | 9/2003 | Swaney | ................. | A01K 59/04 210/361 |
| 8,574,647 B1 * | 11/2013 | Gunderson | ............ | B65D 25/04 206/514 |

(Continued)

FOREIGN PATENT DOCUMENTS

DE    10054510 A1 *  5/2002  ............ A01K 51/00
EP      200841 A1 * 11/1986
(Continued)

OTHER PUBLICATIONS

English-language translation of DE 10054510 A1 (Year: 2002).*

(Continued)

*Primary Examiner* — Lisa L Tsang
(74) *Attorney, Agent, or Firm* — Hamre, Schumann, Mueller & Larson, P.C.

(57) ABSTRACT

A separator device for separating parasites from a population of insects, and a method of separation using such a device, the device comprising a container, a basket configured to be held in the container and provided with a plurality of openings at least through its bottom wall and its side wall, and a lid that is configured to close the container in sealed manner.

16 Claims, 3 Drawing Sheets

(56) References Cited

U.S. PATENT DOCUMENTS

| | | | |
|---|---|---|---|
| 9,516,821 B1 * | 12/2016 | Conrad, Jr. | A01G 27/06 |
| 2002/0008106 A1 * | 1/2002 | Bezek | B65D 1/165 |
| | | | 220/4.27 |
| 2003/0190860 A1 * | 10/2003 | Vanderpool | A01K 51/00 |
| | | | 449/61 |
| 2006/0141904 A1 * | 6/2006 | Teal | A01K 51/00 |
| | | | 449/2 |
| 2008/0280528 A1 * | 11/2008 | Mudd | A01K 51/00 |
| | | | 449/2 |
| 2010/0003893 A1 * | 1/2010 | Oliveira, Jr. | A01K 59/04 |
| | | | 449/2 |
| 2014/0367296 A1 * | 12/2014 | Berger | B65D 77/0453 |
| | | | 206/494 |
| 2015/0099044 A1 * | 4/2015 | Bowa | B65D 81/261 |
| | | | 426/397 |
| 2016/0212977 A1 * | 7/2016 | Krieger | A01K 47/06 |

FOREIGN PATENT DOCUMENTS

| | | | | |
|---|---|---|---|---|
| FR | 2630295 A1 * | 10/1989 | | A01K 1/011 |
| FR | 2993869 A1 * | 1/2014 | | A47J 31/0689 |

OTHER PUBLICATIONS

English-language translation of FR 2630295 A1 (Year: 1989).*

R. Snyder, "How to Make a Sugar Roll Jar," Bee Informed Partnership, available at https://beeinformed.org/2013/03/19/how-to-make-a-sugar-roll-jar/ (Year: 2013).*

* cited by examiner

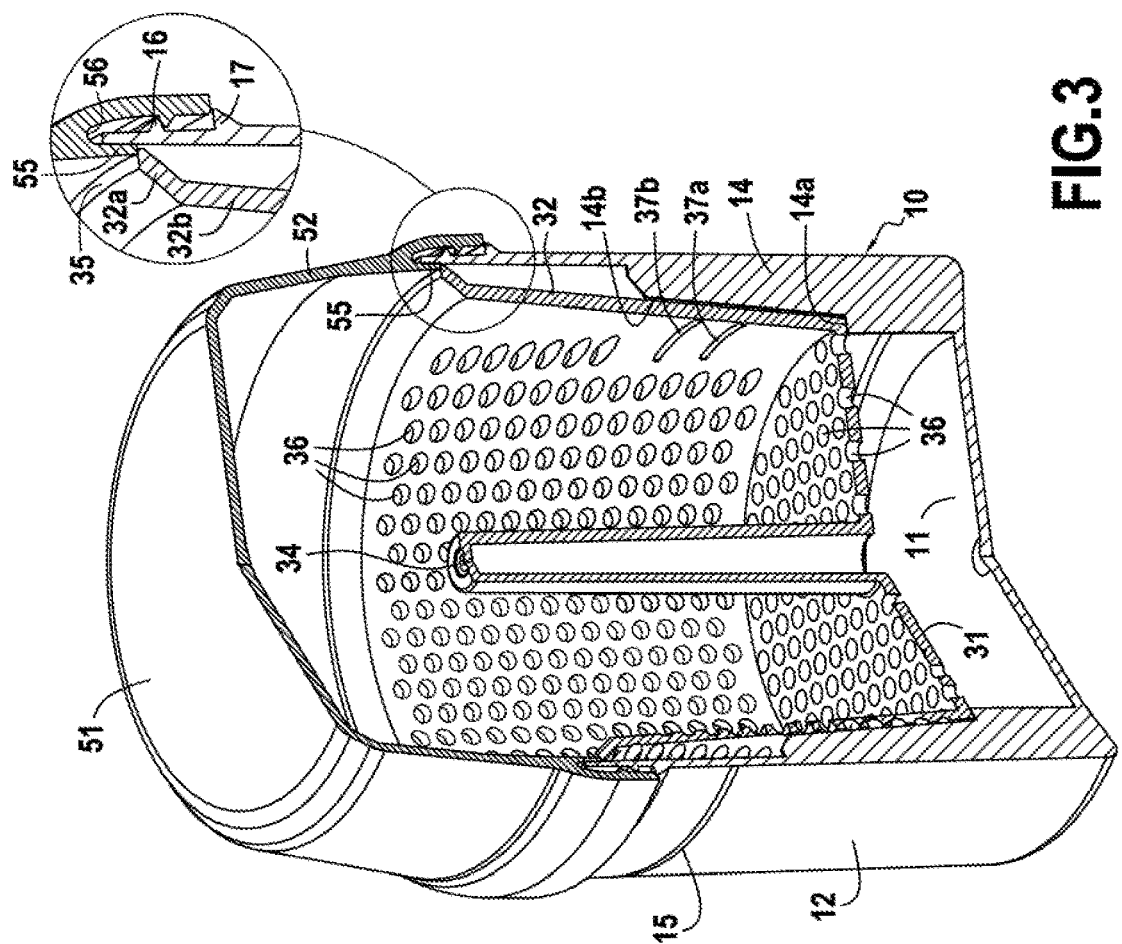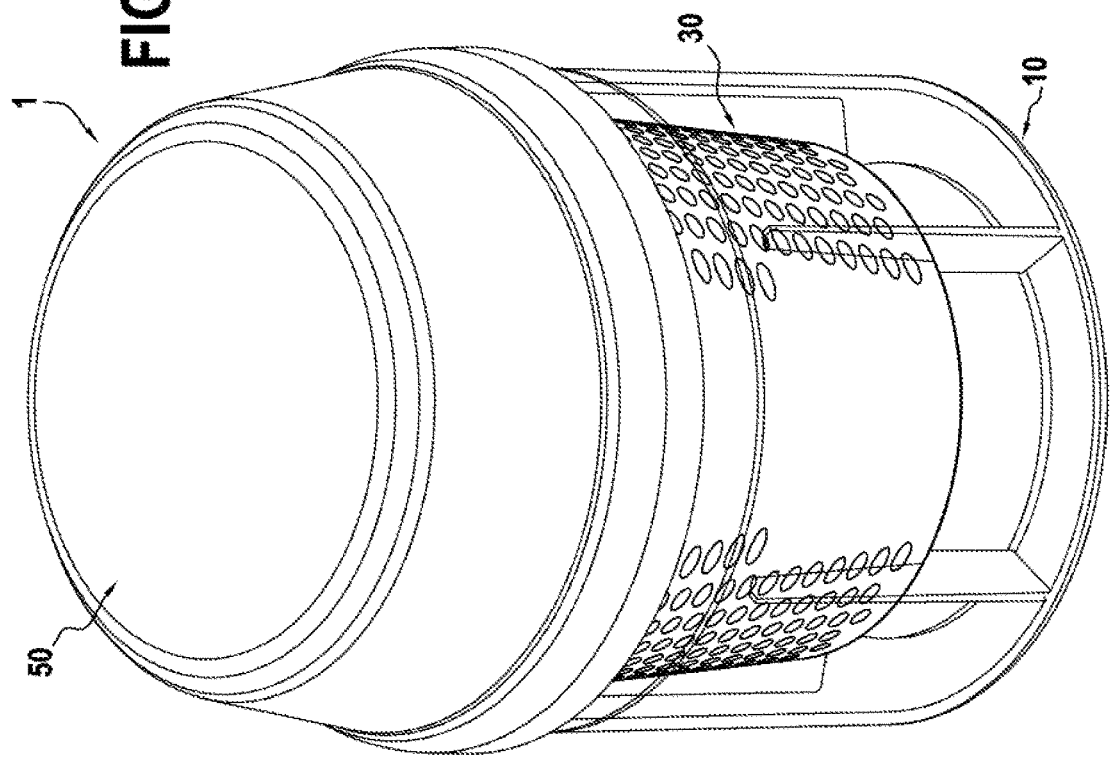

DEVICE FOR SEPARATING PARASITES

FIELD OF THE INVENTION

The present description relates to a separator device for separating parasites from a population of insects, and also to a separation method using such a device.

Such a device or method may be used most particularly for monitoring the infestation of a colony of bees, in particular the infestation of a beehive by varroa, a common parasite of the domesticated bee.

STATE OF THE PRIOR ART

Varroa is a parasite of the mite family that attacks most particularly honeybees of the species *Apis mellifera*, which is in the majority in Europe and in numerous other honey-producing regions.

This parasite, which is 1 millimeter (mm) to 2 mm wide, holds onto bees and feeds itself by puncturing them and sucking out hemolymph, doing this to bees both in the adult stage and in the nymph stage. When parasited in this way, bees are deprived of numerous nutrients and proteins, thereby weakening them, and thus reducing the quantity of honey they produce. Furthermore, these parasites represent a mortal danger for the colony as a result of inoculating pathogens (including viruses) and transmitting diseases between bees when they puncture them. Furthermore, when parasited, the quality of the jelly produced by the nurse bees decreases, which is harmful for proper development of the brood.

Hives must therefore be monitored carefully in order to detect and measure varroa infestation, if any, and monitor the level of infestation during the beekeeping season. For this purpose, various artisanal techniques have been proposed in which a sample of bees from the hive under study is extracted in a bowl; the bowl is then closed by a pierced lid constituting a filter, and a separation substance, such as a solution of alcohol or icing sugar is added and the bowl is shaken so as to separate the varroas from the bees: it is then possible to count the varroas that have been expelled through the filter in order to estimate the proportion of bees that are contaminated and thus the level of infestation of the hive.

Nevertheless, such separation methods encounter serious practical difficulties when shaking: presently-known artisanal devices do not enable the separation substance to be retained appropriately, thereby leading to leaks and to splashes, and possibly to some of the detached varroas being ejected and lost.

There therefore exists a real need for a separator device and a method enabling parasites to be separated from a population of insects and that do not suffer, at least in part, from the drawbacks inherent to the above-mentioned known methods.

SUMMARY OF THE INVENTION

The present description relates to a separator device for separating parasites from a population of insects, the device comprising: a container; a basket configured to be held in the container and provided with a plurality of openings at least through its bottom wall and its side wall; and a lid that is configured to close the container in sealed manner.

By means of such a separator device, it is possible to position the basket in the container, to take insects and put them in the basket, to put a separator substance into place in the container, and then to close the device in sealed manner using the lid.

Under such circumstances, during shaking, the separator substance is enclosed inside the device and cannot escape, thereby avoiding any splashes and possible loses of parasites. In particular, it is possible to shake the device vigorously without fearing any leaks, thus making it possible to obtain better separation results.

In addition, since the basket is provided within the container, with the basket having openings both in its bottom surface and in its peripheral surface, the separator device provides a very large through surface area, thus increasing the probability that parasites will pass through the basket, while ensuring that all of the parasites that have passed through the basket collect in the same location, i.e. in the bottom of the container, thus making them easier to count. In addition, such a configuration makes it easier for the separator substance to flow, increasing its interactions with the insects and with the parasites, thereby facilitating separation of the parasites.

Furthermore, this configuration presents the advantage of being compact and of being simple and practical to use: the insects can be taken directly by using the basket carried in the container, without any intermediate device; the separator substance can then foe added or it may indeed already be present during this operation of taking insects, thus making it possible to monitor its level while taking the insects and thus reduce any risk of overflow; recovering parasites in the bottom of the device makes it easier to count them; and the insects can foe separated easily from the separator substance merely by removing the basket.

In certain embodiments, a gap lies between the bottom wall of the basket and the bottom vail of the container. This gap is at least 1 centimeter (cm) across. Such a gap allows the separator substance to flow well under the basket and between the basket and the bottom of the container, thereby facilitating the separation of parasites. In addition, this gap makes it easier to extract parasites from the basket; it also enables the parasites to be collected by gravity in the bottom of the container.

In certain embodiments, a gap lies between the peripheral wall of the basket and the peripheral wall of the container over at least 50% of the height of the basket, preferably over at least 80%. This gap is at least 3 mm across, and preferably 5 mm across. Such a gap allows the separator substance to flow easily around the basket and between the basket and the peripheral wall of the container, thereby facilitating separation of parasites. In addition, this gap makes it easier to extract parasites from the basket through the orifices in the peripheral wall of the basket.

In certain embodiments, the container includes at least one support, provided in the inside space of the container and co-operating with the basket in order to support it in the container. This support serves to adjust the position of the basket in the container and serves in particular to maintain a gap between the basket and a wall of the container. Furthermore, such a support may optionally block at least some degrees of freedom of the basket to move inside the container, thereby reducing or preventing potential movements of the basket while the separator device is in use: this can make it easier put insects into the basket; the shaking of the insects can also be improved.

In certain embodiments, the support possesses at least one shoulder on which the bottom wall of the basket rests. This enables the axial position of the basket to be adjusted and serves to ensure a gap between the bottom wall of the basket and the bottom wall of the container.

In certain embodiments, the support possesses at least one lateral abutment against which the peripheral wall of the basket comes to bear. This enables the lateral position of the basket to be adjusted and ensures that there is a gap between the peripheral wall of the basket and the peripheral wall of the container.

In certain embodiments, the support is configured to block the basket radially in position. This prevents any lateral movements of the basket inside the container, in particular while putting insects into the basket or while shaking the separator device, thereby reducing the appearance of any unbalance during shaking.

In certain embodiments, the basket is substantially frustoconical. Firstly, such a shape serves to increase the width of the peripheral gap surrounding the basket towards the bottom wall of the basket, thereby facilitating the flow of separator substance all around the basket and facilitating the extraction and recovery of parasites outside the basket. Furthermore, such a shape reduces the phenomenon of insects being compacted against the bottom of the basket, in particular while using a separator liquid, thereby improving the stirring of insects during shaking, thus facilitating the separation of parasites.

In certain embodiments, the basket includes a top portion flush with the peripheral wall of the container. It should be understood that the clearance left between the top portion of the basket and the peripheral wall of the container is less than 1 mm. This reduces any risk of parasites having left the basket going round the top edge of the basket during shaking, which would cause them to drop back into the basket.

In certain embodiments, the top portion is frustoconical, having a cone angle greater than 30°, preferably equal to about 40°. Such a shape serves to provide a rapid transition in diameter making it possible, firstly for the top of the basket to be flush with the peripheral wall of the container so as to prevent parasites from passing, and secondly so as to enable a sufficient peripheral gap to be left at its base to enable the separator substance to flow and enable parasites to leave the basket.

In certain embodiments, the lid includes at least one bearing surface co-operating with the basket so as to hold the basket in position inside the container. In this way, the basket remains stationary relative to the container during shaking so that the bees can be separated more easily from the walls of the basket and can thus be stirred more effectively, consequently improving the separation of parasites. The shaking movement itself is made easier since it is not impeded by the inertia of the basket and a potential phase difference relative to the movement of the basket: the absence of unbalance thus improves the comfort of use and reduces the noise that is generated by the device.

In certain embodiments, the lid has a skirt forming a bearing surface that is configured to press against the top border of the basket. This configuration thus enables the basket to be held effectively when the lid is mounted on the container.

In certain embodiments, the basket has a handle extending in the inside space of the basket. This handle thus enables the basket to be gripped and thus makes it easier to remove from the container.

In certain embodiments, the handle of the basket is formed by a rod extending from the bottom wall of the basket up to at least 50% of the height of the basket, preferably up to 80% of the height of the basket, and more preferably beyond the top border of the basket. This makes it easier to grip, even when insects are present in the basket.

In certain embodiments, at least 70% of the surface area of the bottom wall of the basket has openings.

In certain embodiments, at least 70% of the surface area of the peripheral wall of the basket has openings.

In certain embodiments, at least one opening, and preferably each of the openings, possesses a through section having a diameter lying in the range 2 mm to 4 mm, preferably being equal to about 3 mm. This range is well adapted for separating varroas in particular: such a through section makes it easy to pass varroas while retaining bees in the basket.

In certain embodiments, the mean spacing between two adjacent openings lies in the range 1 mm to 6 mm, possibly in the range 4 mm to 6 mm, and is preferably equal to 4.5 mm, approximately.

In certain embodiments, the separator device also includes a gasket provided at the interface between the container and the lid. This serves to improve the sealing of the separator device.

In certain embodiments, the lid is configured to be screwed onto the container.

In certain embodiments, the container includes at least one level line configured to identify a predetermined quantity of a substance to be inserted into the container. Such a level line makes it possible to insert an appropriate quantity of a separator substance for achieving effective separation of parasites while reducing the risk of overflow when the separator substance or insects are put into place.

In certain embodiments, the basket includes at least one level line configured to identify a predetermined quantity of insects to be inserted into the basket. Such a level line makes it possible to insert a sample of insects having a predetermined statistical size, e.g. 200 or 300 individuals. Specifically, the closer the actual quantity of insects in the basket is to the predetermined quantity, the more reliable the statistical evaluation of the infestation of the population of insects.

In certain embodiments, at least one wall of the container is transparent. Preferably, the entire container is transparent. This makes it possible to see the inside of the container, and thus to count the parasites that have been separated, immediately after shaking and without opening the device.

In certain embodiments, the basket is made out of an opaque material. This masks the insects present inside the basket and thus provides a substantially uniform background for identifying and thus counting the separated parasites more easily.

In certain embodiments, the basket is made in a pale color. The term "pale color" is used to mean a color possessing a value greater than 50%, preferably greater than 70%. This makes it easier to identify and count parasites when the parasites are dark in color, as applies in particular to varroas. In particular, the basket may be white.

The present description also relates to a method of separating parasites from a population of insects, the method comprising the following steps: providing a separator device according to any of the above embodiments, installing the basket in the container, putting a plurality of insects into the basket, putting a separator substance into the container, closing the container with the lid, and shaking the device. The steps may take place in this order or else in a different order.

In certain implementations, the insects are bees, in particular of the *Apis mellifera* species.

In certain implementations, the parasites are varroas, in particular of the *Varroa destructor* species.

In certain implementations, the separator substance is a liquid comprising alcohol and/or a foaming agent. In particular it may be windshield washer liquid, possibly with added antifreeze, or isopropyl alcohol.

In other implementations, the separator substance is a powder. It may in particular be icing sugar.

In certain implementations, the method also includes a step of counting parasites that have become separated and that have collected in the bottom of the basket. Such a step makes it possible to make a statistical estimate of the infestation of the sample that has been taken, and thus of the entire population from which the sample was taken. Such an estimate may constitute an aid for taking a decision concerning the tracking and/or treatment actions to be undertaken concerning the population of parasites.

The characteristics and advantages mentioned above, and others, appear on reading the following detailed description of embodiments of the proposed separator device and method. The detailed description makes reference to the accompanying drawings.

BRIEF DESCRIPTION OF THE DRAWINGS

The accompanying drawings are diagrammatic and seek above all to illustrate the principles of the invention.

In the drawings, from one figure to another, elements or portions of an element that are identical are identified by the same reference signs.

FIG. 1 is a perspective view of an example separator device.

FIG. 3 is a perspective view in section of the FIG. 1 separator device.

DETAILED DESCRIPTION OF EMBODIMENT(S)

Figure 2:
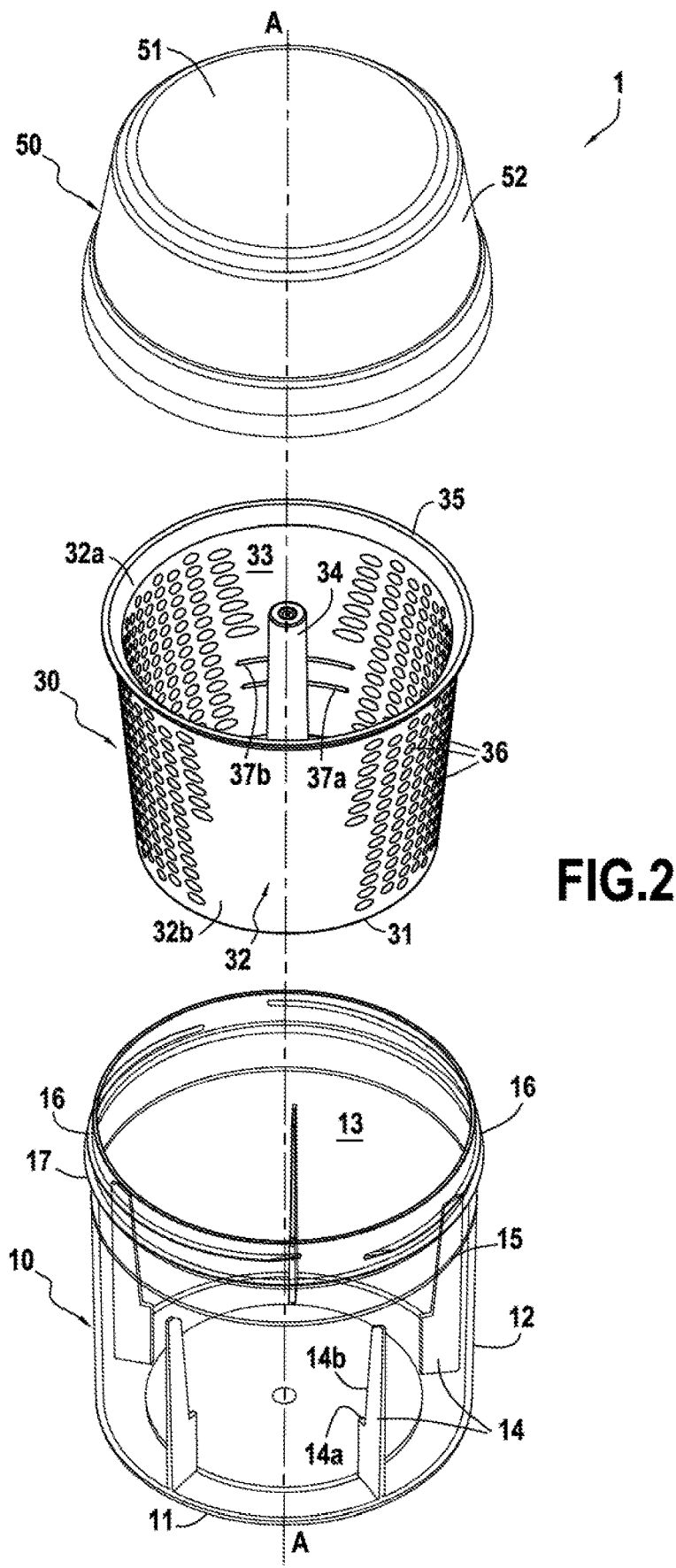
FIG. 2 is an exploded view of the FIG. 1 separator device.
Figure 4:
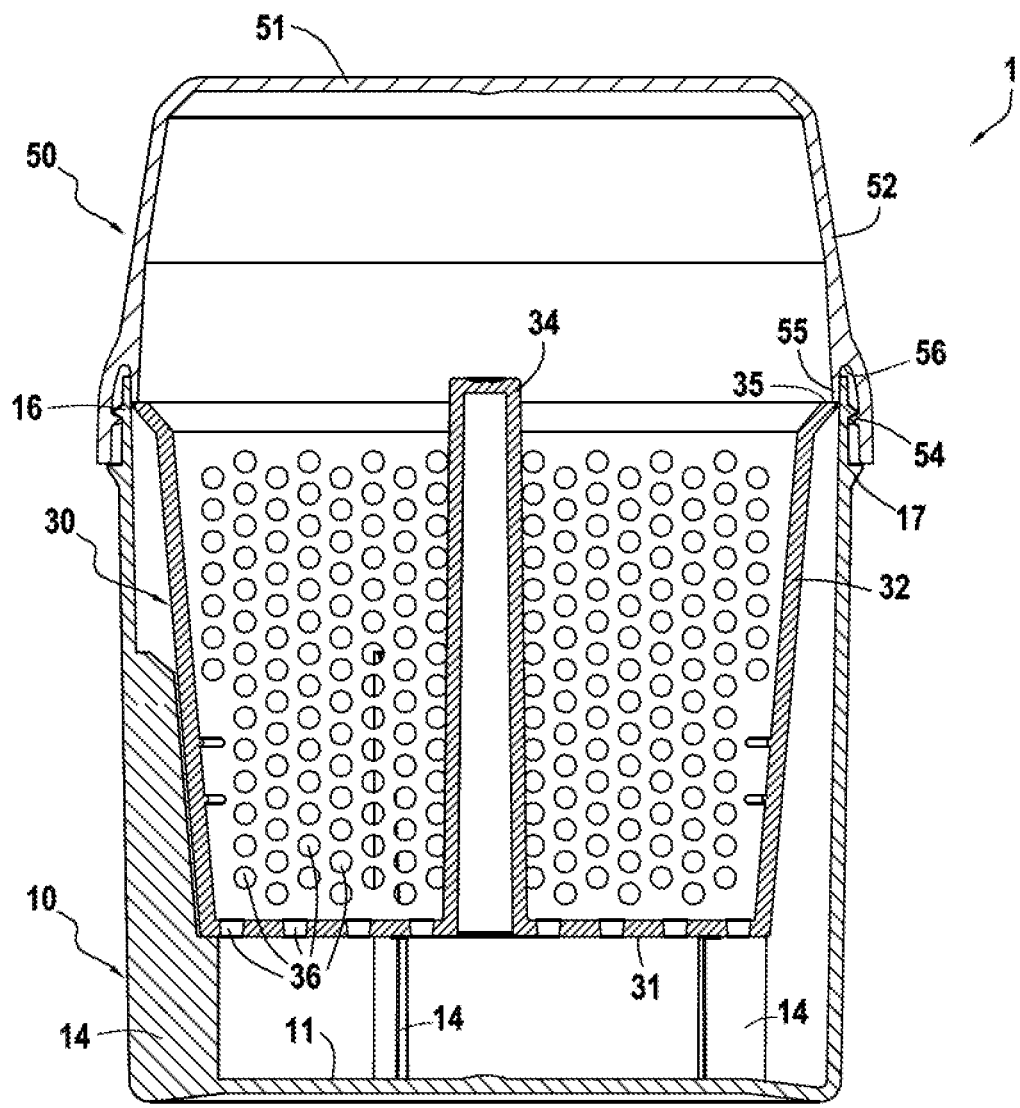
FIG. 4 is an axial section view of the FIG. 1 separator device.

In order to make the invention more concrete, an embodiment of a separator device is described in detail below with reference to the accompanying drawings. It should be recalled that the invention is not limited to this embodiment.

The separator device 1 comprises a container 10, a basket 30 received in the container 10, and a lid 50 closing the container 10.

The container 10 is generally cylindrical in shape about an axis A and it has a diameter of about 10 cm and a height of about 10 cm: it possesses a bottom wall 11 and a peripheral wall 12 defining an inside space 13.

The container 10 also has L-shaped supports 14 extending axially inside the inside space 13 along the peripheral wall 12 from the bottom wall 11. Each of these supports 14 has a shoulder 14a lying in a radial plane and a lateral abutment 14b extending in a sub-vertical direction, sloping a little relative to the central axis A.

In the present example, the container 10 has five identical supports 14 distributed in regular manner around the axis A, i.e. at 72° intervals. Furthermore, the shoulders 14a are situated about 2 cm above the bottom 11 of the container 10.

The container 10 also has a level line 15 on its peripheral wall 12, which line may be etched, drawn, or made in relief. In the present example, the level line 15 is about 7 cm above the bottom 11 of the container 10.

Threads 16 are provided at the top of the peripheral wall 11 of the container 10, on its outside surface, so as to enable the lid 50 to be screwed onto the top of the container 10. An annular shoulder 17 is also provided below the threads 16 so as to form an axial abutment for the lid 50.

In the present embodiment, the container 10 is made of transparent plastics material and is obtained as a single piece by injection molding.

The basket 30 is generally frustoconical in shape about the axis A having a height of about 8 cm and a diameter that goes from about 8 cm at its bottom end to about 10 cm at its top end; it possesses a bottom wall 31 and a peripheral wall 32 defining an inside space 33.

The basket 30 also has a central tubular handle 34 extending along the axis A from the bottom wall 31 so as to project a few millimeters beyond the top border 35 of the peripheral wall 32 of the basket 30.

The peripheral wall 32 has a frustoconical top portion 32a that, in this embodiment, forms an angle of about 40° relative to the axis A, and a bottom portion 32b that is frustoconical and that, in this embodiment, forms an angle of about 5° with the axis A.

The bottom wall 31 of the basket 30 has a plurality of circular holes 36 distributed over the entire available surface area of the bottom wall 31. The bottom portion 32b of the peripheral wall 32 of the basket 30 is also provided with holes 36 that are distributed in two facing zones, each covering practically an entire half of the bottom portion 32b of the peripheral wall 32.

In the present description, the holes 36 have a diameter of about 3 mm, and they are installed in a hexagonal mesh with a mesh parameter of about 5 mm.

The basket 30 also has a plurality of level lines 37a, 37b that are etched, drawn, or formed in relief on its peripheral wall 32. In the present embodiment, a first level line 37a lies at about 17 mm above the bottom 31 of the basket 30 and corresponds to a volume of approximately 200 bees, and a second level line 37b lies about 25 mm above the bottom 31 of the basket 30, and corresponds to a volume of about 300 bees.

When the basket 30 is installed in the container 10, the bottom wall 31 of the basket 30 rests on the shoulders 14a of the supports 14 of the container 10 so that there is an axial distance of about 2 cm between the bottom wall 31 of the basket 30 and the bottom 11 of the container 10. Furthermore, the bottom portion 32b of the peripheral wall 32 of the basket is flush with the lateral abutments 14b of the supports 14 so that a radial distance of at least 3 mm lies between the peripheral wall 32 of the basket 30 and the peripheral wall 12 of the container 10, at least along the bottom portion 32b of the peripheral wall 32 of the basket 30. The top portion 32a of the peripheral wall 32 of the basket 30 is flush with the peripheral wall 12 of the container 10 at the level of the top border 35 of the basket 30.

In the present embodiment, the basket 30 is made of white plastics material that is obtained as a single piece by injection molding.

The lid 50 is generally frustoconical in shape about the axis A having a height of about 5 cm and a diameter lying approximately in the range 8 cm to 10 cm; it possesses a top wall 51 and a peripheral wall 52.

Threads 54 are provided at the base of the peripheral wall 52 of the lid 50 on its inside surface, and they are configured to co-operate with threads 16 of the container 10.

The lid 50 also has a skirt 55 extending axially downwards from the inside surface of the peripheral wall 52 and configured to bear against the top border 35 of the basket 30 when the lid 50 is screwed onto the container 10. Consequently, once the lid 50 has been screwed onto the container 10, the basket 30 is prevented from moving inside the separator device 1.

The dimensions of the lid 50 match the dimensions of the container 10, particularly concerning the threads 16 and 54 so as to ensure that the separator device 1 is sealed when the lid 50 is screwed onto the container 10; the skirt 55 of the lid 50 and the shoulder 17 of the container also assist in improving such sealing. Nevertheless, in certain examples, it is possible to add an O-ring in the bottom of the groove 56 that is formed between the skirt 55 and the peripheral wall 52 of the lid 50 to further improve such sealing.

The operation of the separator device 1 is explained below in the context of a description of an implementation of the method of separating varroas from a sample of bees taken from a hive in which it is desired to estimate the level of infestation.

The basket 30 is initially installed in the container 10: because of the supports 14, the basket 30 is held in stable manner inside the container 10. Bees are then taken from a frame of a hive by brushing the backs of the bees downwards, thereby causing the bees to drop into the basket 30. Bees continue to be taken until the level of bees reaches the second level line 37b of the basket 30 that corresponds to a quantity of approximately 300 bees. Most of the bees taken from the frame are not foragers and do not fly: they therefore cannot escape from the basket 30.

A separator liquid, e.g. windshield washer including antifreeze, is then added to the container 10 through the basket 30 and the bees so as to reach the level line 15 of the container 10. This separator liquid serves to degrease the medium, and in particular the legs of the varroas, thus making it easier to separate the varroas. The separator liquid may also put the varroas to sleep or even kill them, so that they relax their grip and separate from the bees.

In a variant implementation, some or indeed all of the separator liquid may be put into place in the container before the operation of taking bees. Specifically, this makes it possible while taking the bees to shake the container vertically a few times so as to wet the bees and thus prevent them from moving easily. It is also possible to bang the container downwards onto a firm support: any bees attempting to climb up the walls then let go and drop to the bottom of the basket, making the collection operation easier. Once enough bees have been taken, it is possible to fill the container with separator liquid up to the desired level, while reducing any risk of bees escaping in the interim.

The lid 50 is then screwed firmly onto the container 10: the skirt 55 of the lid 50 then presses against the top border 35 of the basket 30 so as to hold the basket 30 in position inside the separator device 1.

The separator device 1 can then be shaken vigorously, and then more gently, downwards along the axial direction A for a duration of about 30 seconds (s). During this shaking, most of the varroas that are present become separated from the bees, and the flow of separator liquid sweeps them through the holes 36 in the basket 30 so that they drop onto the bottom of the container 10. It is also possible to perform circular swirling movements, with the holes through the peripheral wall of the basket then also serving to separate varroas.

The varroas that have dropped to the bottom of the container 10 can then be counted in order to evaluate the level of infestation of the sample, and on that basis, evaluate the level of infestation of the hive.

A second cycle of shaking followed by taking a second reading may optionally be undertaken in order to improve the accuracy of the test, on the assumption that some of the varroas might not be separated on the first occasion.

Once the test has been finished, the lid 50 is removed and the basket 30 can be gripped by means of its handle 34 in order to remove the bees; the container 10 is then likewise emptied. The separator device 1 can then be used again in order to test another population of bees, e.g. coming from another hive.

Although the present invention is described with reference to specific embodiments, it is clear that modifications and changes may be undertaken on these embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

It is also clear that all of the characteristics described with reference to the method can be transposed, singly or in combination, to a device, and vice versa, all of the characteristics described with reference to a device can be transposed, singly, or in combination, to a method.

The invention claimed is:

1. A separator device for separating parasites from a population of insects, the separator device comprising:
    a container;
    a basket configured to be held in the container and provided with a plurality of openings at least through a bottom wall thereof and a side wall thereof, the basket having a handle extending in an inside space of the basket, the handle extending from the bottom wall of the basket to a distal end, the distal end projects beyond a top edge of the basket, and the distal end is closed, wherein in use the insects with the parasites are to be inserted into the basket, and the openings in the basket are sized to prevent passage of the insects therethrough and permit passage of the parasites therethrough; and
    a lid configured to close the container in a sealed manner, the lid including at least one bearing surface co-operating with the basket so as to hold the basket against the container and in position inside the container, enabling the basket to remain stationary relative to the container during shaking,
    wherein when the insects with the parasites are in the basket and the separator device is shaken, the shaking of the separator device causes the parasites to be separated from the insects and pass through the openings while the insects are retained within the basket.

2. The separator device according to claim 1, wherein a gap lies between the bottom wall of the basket and a bottom wall of the container.

3. The separator device according to claim 1, wherein a gap lies between a peripheral wall of the basket and a peripheral wall of the container over at least 50% of a height of the basket.

4. The separator device according to claim 1, wherein the container includes at least one support provided in an inside space of the container for supporting the basket, and each of the at least one bearing surface of the lid and the at least one support of the container co-operate with the basket to hold the basket in position inside the container.

5. The separator device according to claim 4, wherein the at least one support possesses at least one shoulder on which the bottom wall of the basket rests.

6. The separator device according to claim 5, wherein the at least one support is configured to block the basket radially in position.

7. The separator device according to claim 5, wherein the at least one support possesses at least one lateral abutment against which the side wall of the basket rests.

8. The separator device according to claim 4, wherein the at least one support is configured to block the basket radially in position.

9. The separator device according to claim 1, wherein the basket includes a top portion flush with a peripheral wall of the container.

10. The separator device according to claim 1, wherein the container includes a first level line configured to identify a predetermined quantity of a separator substance to be inserted into the container.

11. The separator device according to claim 10, wherein the basket includes a second level line configured to identify a predetermined quantity of the insects to be inserted into the basket.

12. The separator device according to claim 1, wherein at least one wall of the container is transparent, and wherein the basket is made out of an opaque material.

13. The separator device according to claim 1, wherein the basket includes at least one level line configured to identify a predetermined quantity of the insects to be inserted into the basket.

14. The separator device according to claim 1, wherein each of the container and the lid is solid without any openings extending therethrough.

15. A method of separating parasites from a population of insects, the method comprising the following steps:

providing a separator device that includes a container, a basket configured to be held in the container and provided with a plurality of openings at least through a bottom wall thereof and a side wall thereof, the openings in the basket are sized to prevent passage of the insects therethrough and permit passage of the parasites therethrough, and a lid that is configured to close the container in a sealed manner, the basket having a handle extending in an inside space of the basket, the handle extending from the bottom wall of the basket to a distal end, the distal end projects beyond a top edge of the basket, the distal end is closed, and the lid including at least one bearing surface co-operating with the basket so as to hold the basket against the container and in position inside the container, enabling the basket to remain stationary relative to the container during shaking;

installing the basket in the container and putting the insects with the parasites into the basket;

putting a separator substance into the container, the separator substance configured to facilitate separation of the parasites from the insects;

closing the container with the lid; and shaking the separator device, wherein the basket remains stationary relative to the container during the shaking, and the shaking of the separator device applies the separator substance onto the insects with the parasites and causes the parasites to be separated from the insects and pass through the openings while the insects are retained within the basket.

16. A separator device for separating parasites from a population of insects, the separator device consisting of:

a container including an end wall and a peripheral wall defining an inside space, an open end opposite the end wall, and a plurality of supports within the inside space and extending along the peripheral wall;

the peripheral wall including threads adjacent to the open end;

a basket configured to be held in the inside space of the container in engagement with the plurality of supports, the basket having an open end and provided with a plurality of openings at least through an end wall thereof and a side wall thereof, the basket including a handle that extends in an inside space of the basket, the handle extending from the end wall of the basket to a distal end, the distal end projects beyond an edge of the basket that defines the open end of the basket, and the distal end is closed, wherein in use the insects with the parasites are to be inserted into the basket, and the openings in the basket are sized to prevent passage of the insects therethrough and permit passage of the parasites therethrough; and a lid that includes threads that are engageable with the threads on the peripheral wall of the container so that the lid can be screwed onto the container and close the open end of the container in a sealed manner, the lid including at least one bearing surface, each of the at least one bearing surface of the lid and the plurality of supports of the container co-operate with the basket to hold the basket in position within the inside space of the container, enabling the basket to remain stationary relative to the container during shaking.

* * * * *